(12) United States Patent
Van Druten et al.

(10) Patent No.: US 10,955,035 B2
(45) Date of Patent: Mar. 23, 2021

(54) TRANSMISSION SYSTEM

(71) Applicant: Punch Powertrain N.V., Sint-Truiden (BE)

(72) Inventors: Roëll Marie Van Druten, Eindhoven (NL); Alexander Franciscus Anita Serrarens, Waalre (NL); Bas Gerard Vroemen, Eindhoven (NL)

(73) Assignee: Punch Powertrain N.V., Sint-Truiden (BE)

( * ) Notice: Subject to any disclaimer, the term of this patent is extended or adjusted under 35 U.S.C. 154(b) by 572 days.

(21) Appl. No.: 15/782,036

(22) Filed: Oct. 12, 2017

(65) Prior Publication Data

US 2018/0112753 A1 Apr. 26, 2018
US 2020/0217403 A9 Jul. 9, 2020

Related U.S. Application Data

(63) Continuation of application No. 14/417,093, filed as application No. PCT/NL2013/050552 on Jul. 24, 2013, now Pat. No. 9,897,182.

(30) Foreign Application Priority Data

Jul. 24, 2012 (NL) ..................................... 2009226

(51) Int. Cl.
*F16H 3/00* (2006.01)
*F16H 3/72* (2006.01)
*F16H 37/02* (2006.01)

(52) U.S. Cl.
CPC ........... *F16H 37/022* (2013.01); *F16H 3/725* (2013.01); *F16H 3/006* (2013.01); *F16H 3/721* (2013.01); *F16H 3/724* (2013.01); *F16H 2037/025* (2013.01); *Y10T 74/19023* (2015.01); *Y10T 74/19037* (2015.01)

(58) Field of Classification Search
CPC ........... F16H 1/163; F16H 1/166; F16H 1/225
USPC ....................................... 74/330, 665 F, 331
See application file for complete search history.

(56) References Cited

U.S. PATENT DOCUMENTS

| | | | | |
|---|---|---|---|---|
| 4,335,429 | A * | 6/1982 | Kawakatsu | ............ B60K 6/387 |
| | | | | 701/102 |
| 5,031,479 | A * | 7/1991 | Ibamoto | ................. B60W 10/11 |
| | | | | 477/110 |
| 5,407,401 | A | 4/1995 | Bullmer | |
| 6,712,734 | B1 * | 3/2004 | Loeffler | ............... B60W 10/113 |
| | | | | 477/5 |
| 7,080,569 | B2 | 7/2006 | Preisner | |

(Continued)

FOREIGN PATENT DOCUMENTS

| | | |
|---|---|---|
| CN | 101144520 A | 3/2008 |
| CN | 101779060 A | 7/2010 |

(Continued)

*Primary Examiner* — Ha Dinh Ho
(74) *Attorney, Agent, or Firm* — Banner & Witcoff, Ltd.

(57) ABSTRACT

A transmission system is disclosed, having a clutch module with an input and a first and a second output. Between the first output and the input, a first clutch device is present, and between the second output and the input a second clutch device is present. The transmission system further includes a transmission module having a first partial transmission and a second partial transmission, in which the two outputs of the clutch module are connected to the two inputs of the transmission module.

21 Claims, 15 Drawing Sheets

(56) References Cited

U.S. PATENT DOCUMENTS

| | | | |
|---|---|---|---|
| 7,464,616 B2 * | 12/2008 | Leibbrandt | B60K 6/442 74/331 |
| 7,476,176 B2 * | 1/2009 | Ibamoto | B60K 6/48 477/15 |
| 7,840,329 B2 | 11/2010 | Katakura | |
| 7,950,302 B2 * | 5/2011 | Burgardt | F16H 3/093 74/331 |
| 8,050,830 B2 | 11/2011 | Komeda | |
| 8,177,685 B2 | 5/2012 | Leibbrandt | |
| 8,251,866 B2 * | 8/2012 | Kaltenbach | B60K 6/48 477/5 |
| 8,360,183 B2 | 1/2013 | Sauviet | |
| 9,897,182 B2 | 2/2018 | Van Druten et al. | |
| 2003/0074992 A1 | 4/2003 | Gierling | |
| 2003/0148847 A1 | 8/2003 | Kawamoto et al. | |
| 2008/0064550 A1 | 3/2008 | Holmes | |
| 2008/0236917 A1 | 10/2008 | Abe et al. | |
| 2020/0208722 A1 | 7/2020 | Van Druten et al. | |

FOREIGN PATENT DOCUMENTS

| | | |
|---|---|---|
| CN | 103459894 A | 12/2013 |
| EP | 1209017 A2 | 5/2002 |
| JP | 2002089677 A | 3/2002 |
| JP | 2008247192 A | 10/2008 |
| WO | 02070919 A1 | 9/2002 |
| WO | 2008151443 A1 | 12/2008 |
| WO | 2011133033 A1 | 10/2011 |
| WO | 2012102613 A1 | 8/2012 |
| WO | 2012102614 A2 | 8/2012 |
| WO | 2012112028 A2 | 8/2012 |

* cited by examiner

TRANSMISSION SYSTEM

CROSS-REFERENCE TO RELATED APPLICATIONS

This application is a continuation of U.S. application Ser. No. 14/417,093, filed Jan. 23, 2015, now allowed, which is a U.S. National Stage application under 35 U.S.C. § 371 of International Application PCT/NL2013/050552 (published as WO 2014/017905 A1), filed Jul. 24, 2013, which claims the benefit of priority to NL 2009227, filed Jul. 24, 2012. Benefit of the filing date of each of these prior applications is hereby claimed. Each of these prior applications is hereby incorporated by reference in its entirety.

FIELD OF THE INVENTION

The invention relates to a transmission system comprising:
- a clutch module having an input and a first and a second output, wherein between the first output and the input, a first clutch device provided with first actuating means is present, and between the second output and the input a second clutch device with second actuating means is present, and
- a transmission module, with an output and a first and a second input, wherein between the first input and the output, a first partial transmission provided with at least one transmission is present, and between the second input and the output a second partial transmission provided with at least one further transmission or a mechanical connection is present,
- in which the two outputs of the clutch module are connected to the two inputs of the transmission module.

DESCRIPTION OF RELATED ART

Such a transmission system is generally known.

SUMMARY OF THE INVENTION

It is an object of the present invention to improve the known transmission system. To this end the transmission system according to the invention is characterized in that:
- the transmission system comprises a short-circuit clutch, which is present between the two outputs of the clutch module and/or the two inputs of the transmission module, and
- the transmission inside the first partial transmission is continuously variable within a specified transmission range.

For embodiments of the transmission system according to the invention, reference is made to the appended claims.

The invention further relates to a transmission system for a vehicle, comprising an input, which can be connected to a drive source, and an output, which can be connected to a load, comprising:
- a transmission provided with a transmission housing with a first input shaft and an output shaft connected to the output, wherein a first switchable speed transforming gear is present between the first input shaft and the output shaft,
- a clutch with a first clutch part, which is connected to the input, and a second clutch part, which is connected to the first input shaft of the transmission, and
- a planetary gear with at least three rotational members of which a first rotation body is connected to the input, and a second rotation body is coupled to the output, wherein the transmission further comprises a second input shaft, wherein between the second input shaft and the output shaft a second switchable speed transforming gear is present, and wherein the second rotational member of the planetary gear is connected with the second input shaft.

With respect to this transmission system, the invention is characterized in that a third rotational member of the planetary gear is connected to an electric motor.

An embodiment of this transmission system is characterized in that the third rotation body is further connected to a brake.

BRIEF DESCRIPTION OF THE DRAWINGS

The invention will be further elucidated below on the basis of drawings. These drawings show embodiments of the transmission system according to the method in the present invention.

DETAILED DESCRIPTION

In FIGS. 1 to 4 embodiments of the transmission system according to the invention are shown. In these embodiments the variable speed drive may be mechanical, hydraulic, electrical, or as a combination of these.

Examples of mechanical variable speed drives are:
- a pulley variable speed drive with push belt or chain,
- a cone-ring variable speed drive with two cones and a ring,
- a planetary gear with at least three rotational members of which a third rotational member can support torque to the fixed world via actuating means.

In these embodiments:
A=drive source
L=load
TS=transmission system
In=input of transmission system
Out=output of transmission system
CM=clutch module
O1, O2=outputs of clutch module
TM=transmission module
i1, i2=inputs of transmission module
C, C1=clutches
B,B1,B2=brakes
P=planetary gear set
VAR=variable speed drive
T1, T2=first and second partial transmissions
I, I1, I2, I11, I22=speed transforming gears S=short circuit clutch
S1, S2, SR, S11, S22=transmission clutches
IF=final speed transforming gear
IR=reverse speed transforming gear
EM=electric motor In FIG. 2 the transmission clutches S1 and S2 are optionally.

Figure 1:
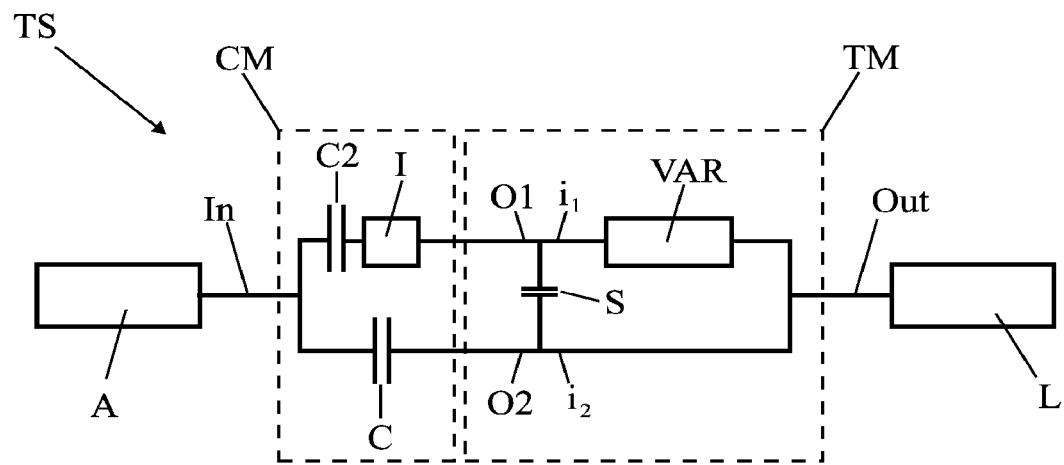
FIGS. 1-12 show embodiments of a transmission system according to the present invention.
Figure 2:
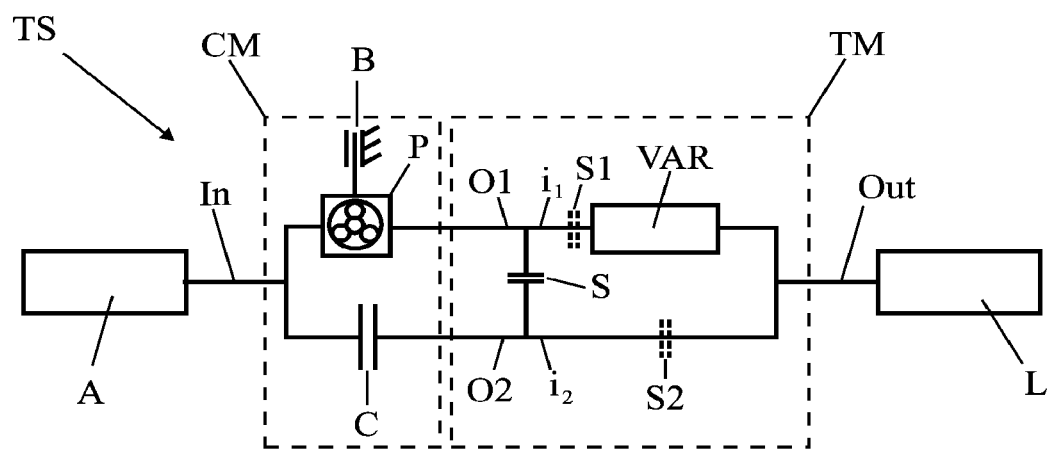
Figure 3:
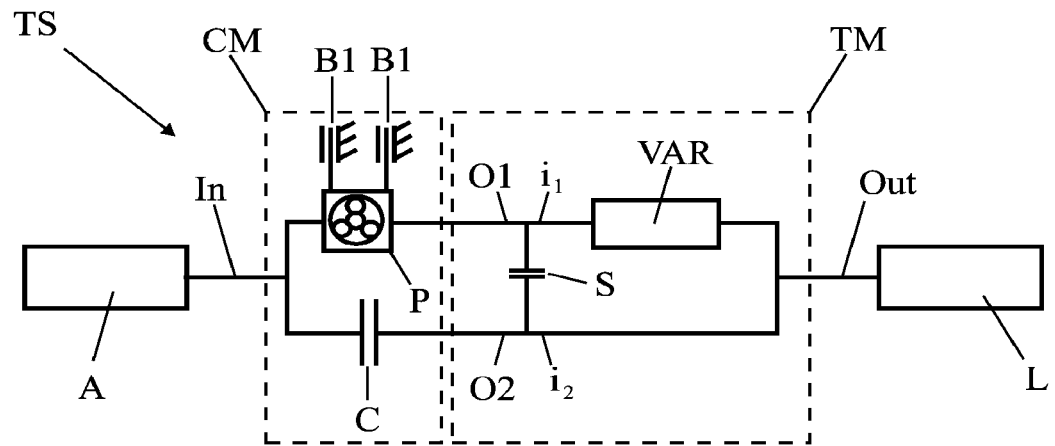
Figure 4:
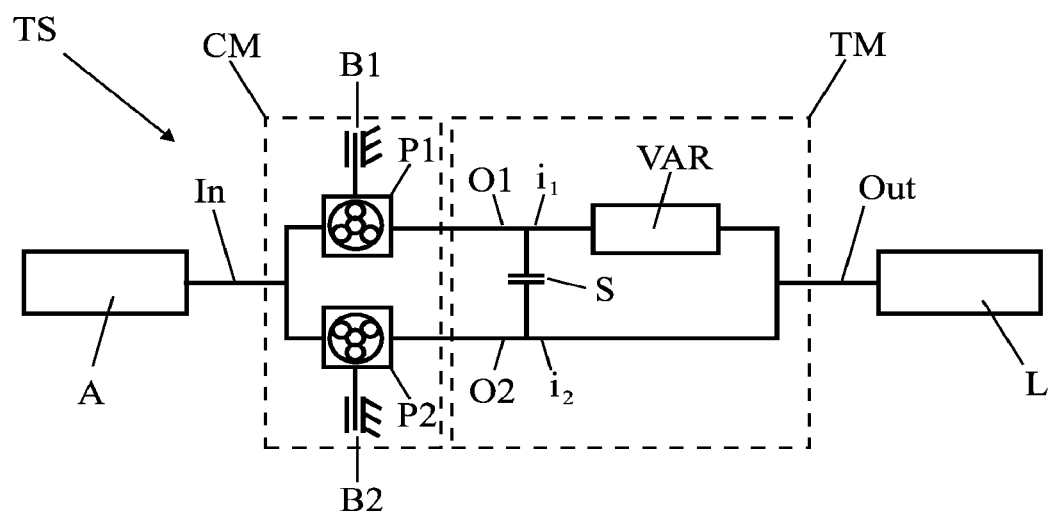
Figure 5:
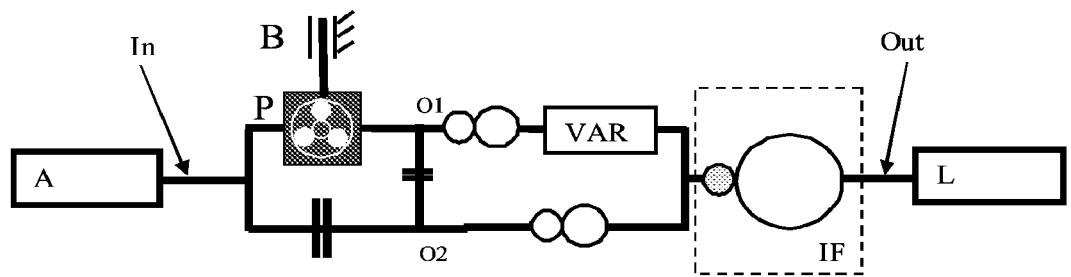
Figure 6:
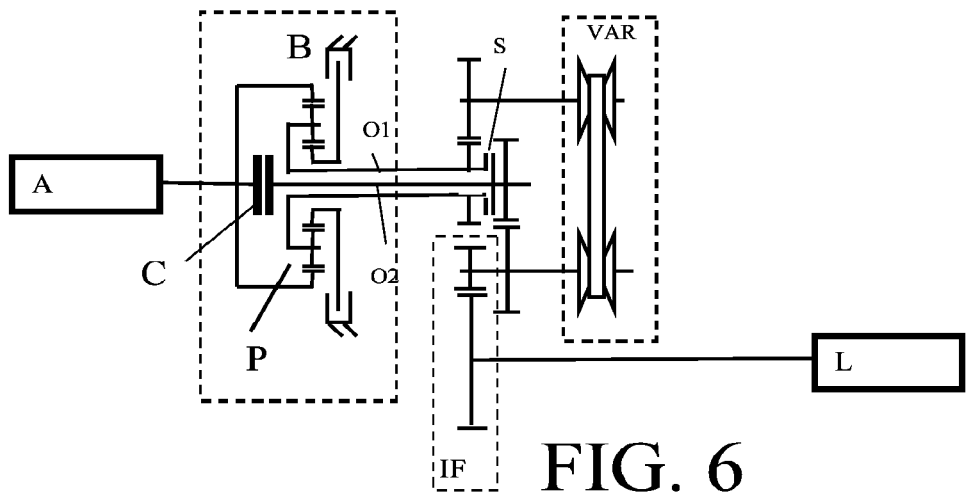

FIGS. 5 and 6 show an embodiment of the transmission system.

Figure 7:
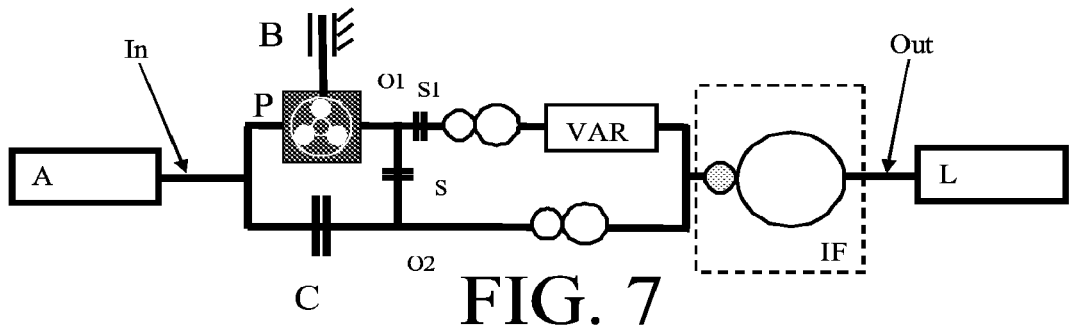
Figure 8:
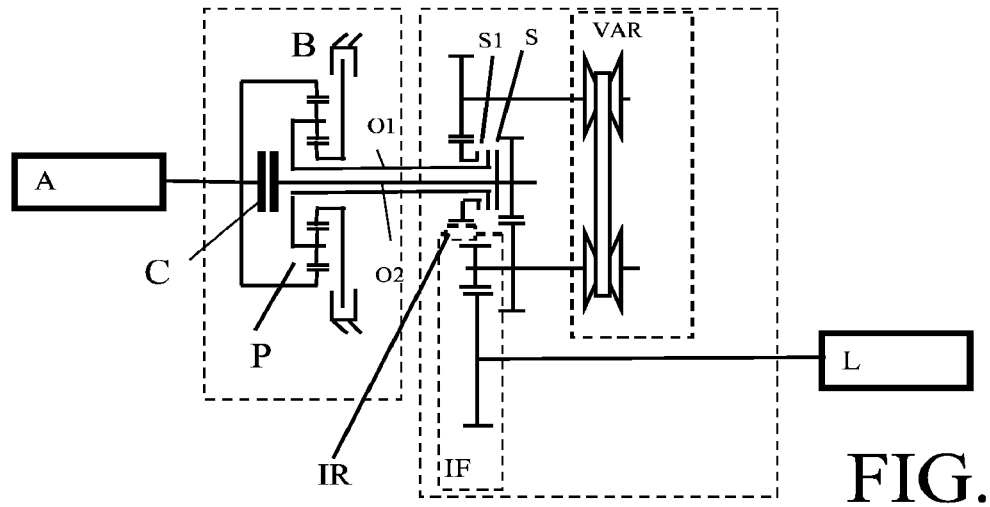

FIGS. 7 and 8 show a further embodiment of the transmission system. In the partial transmission which is present between the second input O2 and output Out or in the final transmission IF a reverse gear IR is present. By actuating brake B it is possible to drive from stand still in both forward and rearward directions. The variable speed drive VAR will not be used in that case. When switching from the brake to the clutch drive torque remains present. When the clutch is closed and the brake is open the variable speed drive is still not used.

Now the claw coupling and/or synchronizer S can be decoupled and S1 can be closed. By switching back again from the brake to the clutch drive can be performed via the variable speed drive and the higher gears can be realized. Thus there are two toothed gears with which driving from stand still is possible and the 3 gear and higher gears (3-10) can be realized with the variable speed drive. Because of this an extremely large ratio coverage can be achieved. In addition, the variable speed drive can be much smaller (RC between 3 and 4).

Figure 9:
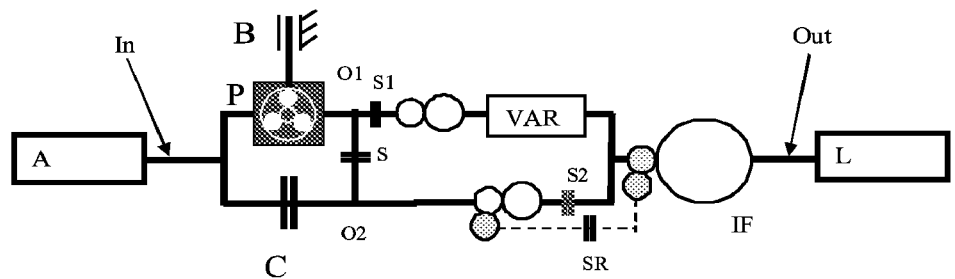
Figure 10:
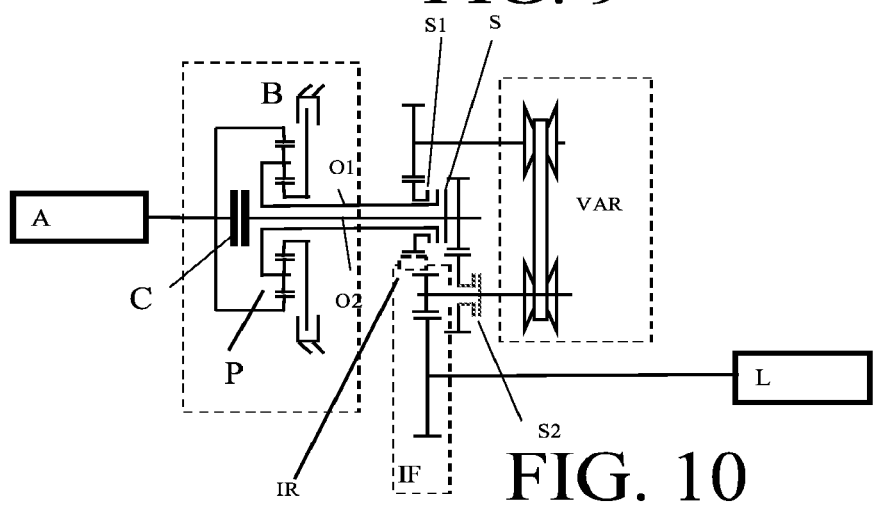

FIGS. 9 and 10 show a further embodiment of the transmission system. In the partial transmission which is present between the second input O2 and output Out or in the final transmission IF a reverse gear IR is present. By actuating brake B it is possible to drive from stand still in both forward and rearward directions. The variable speed drive VAR will not be used in that case. When switching from the brake to the clutch drive torque remains present. When the clutch is closed and the brake is open the variable speed drive is still not used.

Now the claw coupling and/or synchronizer S can be decoupled and S1 can be closed. By switching back again from the brake to the clutch drive can be performed via the variable speed drive and the higher gears can be realized. Now switching from clutch to brake can be performed so that the ratio coverage can still be increased. Thus there are two toothed gears with which driving from stand still is possible and the $3^{rd}$ and $4^{th}$ gears can be realized with the variable speed drive. Because of this an extremely large ratio coverage can be achieved. In addition, the variable speed drive can be much smaller (RC between 2.5 and 3.5).

Figure 11:
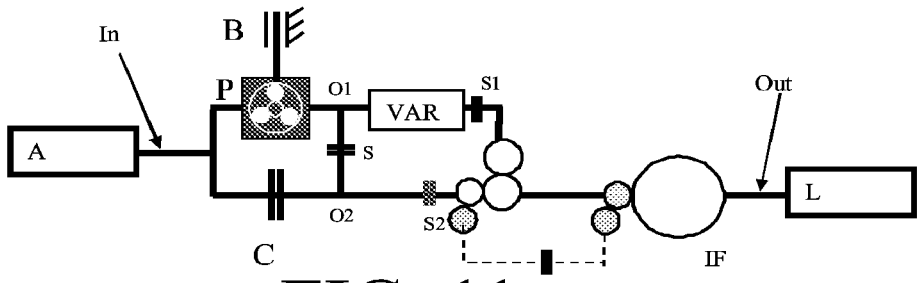
Figure 12:
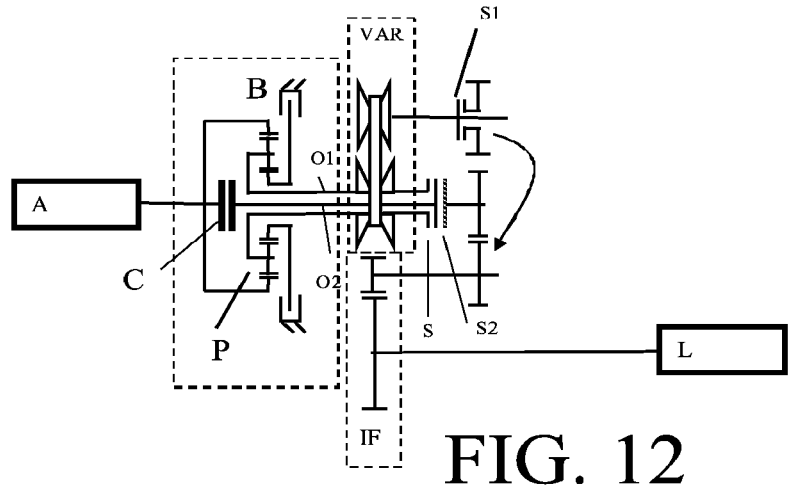
Figure 13:
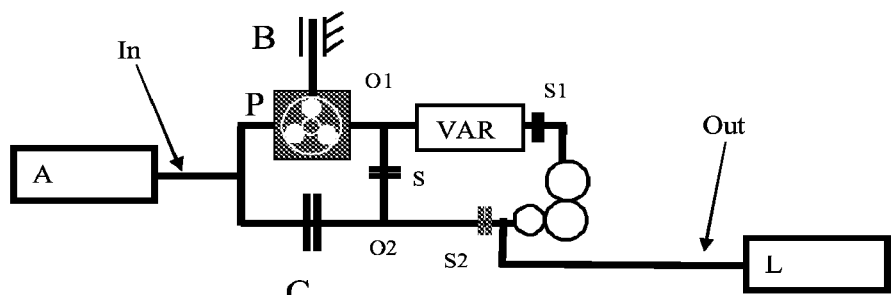
FIGS. 13 and 14 show further embodiments of a transmission system according to the present invention, for rear wheel drive.
Figure 14:
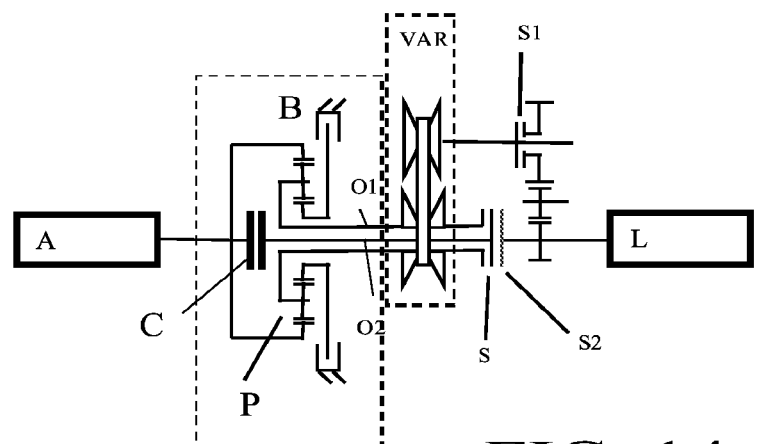
Figure 15:
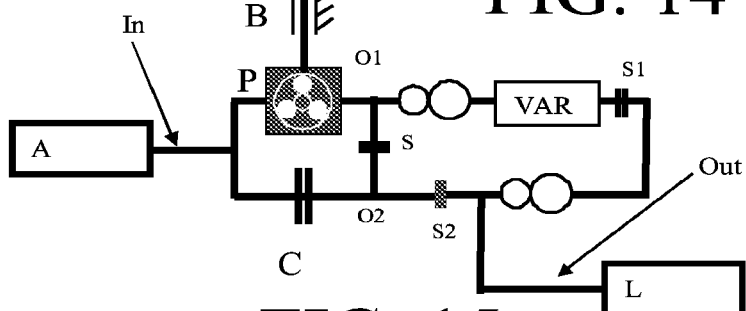
FIGS. 15-31 and 33 show yet further embodiments of a transmission system according to the present invention.
Figure 16:
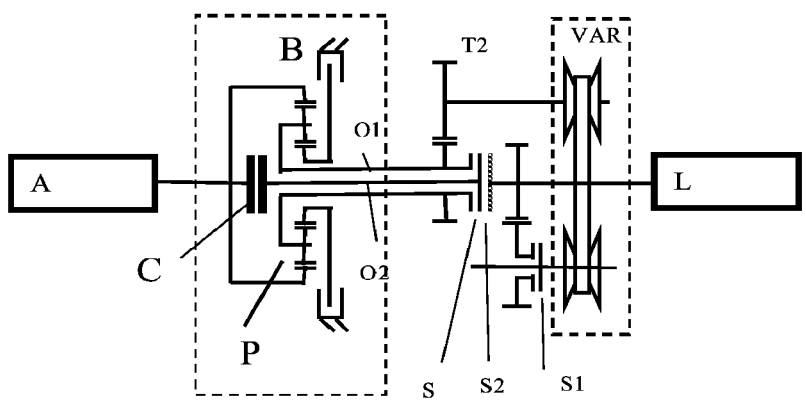
Figure 17:
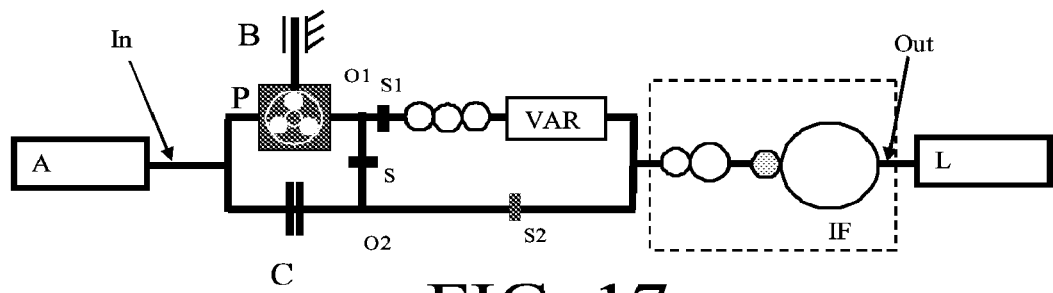
Figure 18:
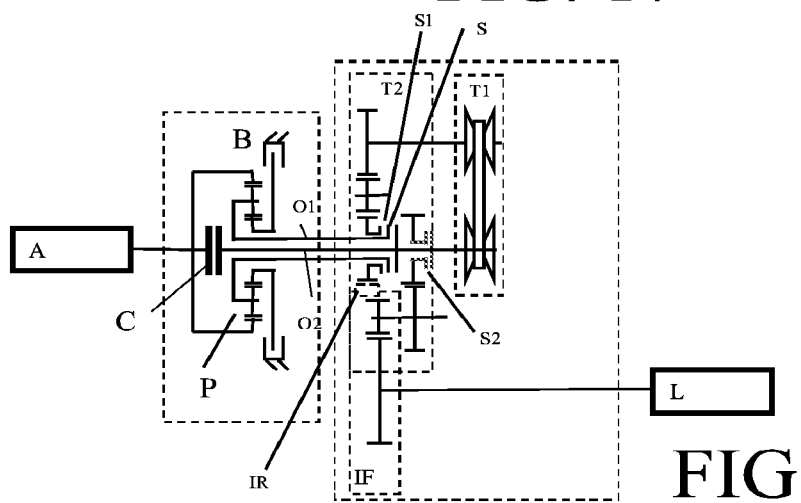
Figure 19:
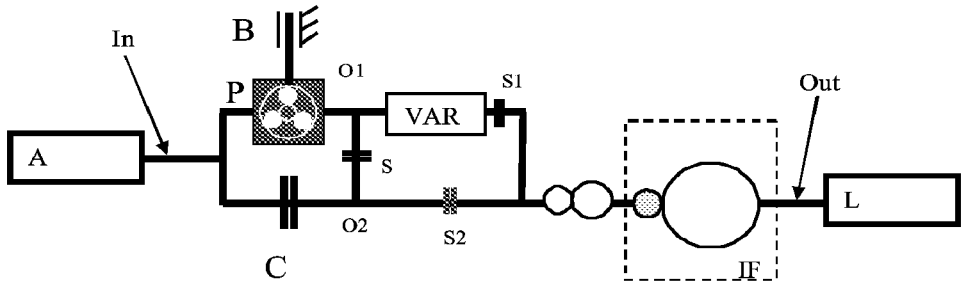

FIGS. 11 and 12 show still a further embodiment of the transmission system. In the partial transmission which is present between the second input O2 and output Out or in the final transmission IF a reverse gear IR is present. Gear wheels of the partial transmission or the final transmission IF are part of the reverse gear. FIGS. 13 and 14 show an embodiment of the transmission system for rear wheel drive.

Figure 20:
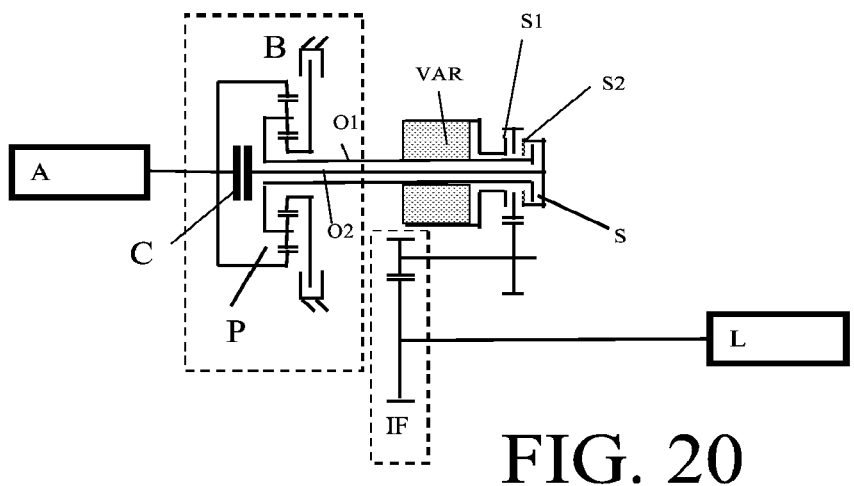
Figure 21:
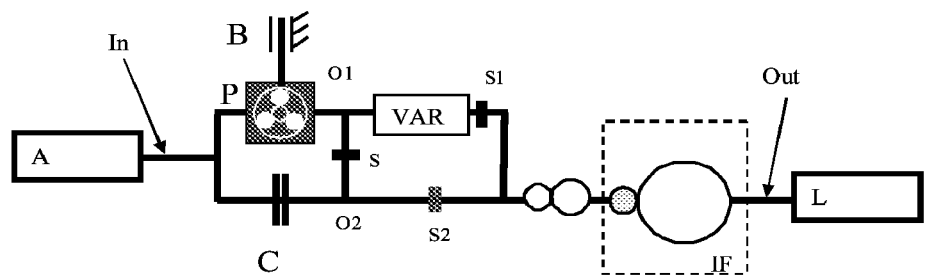
Figure 22:
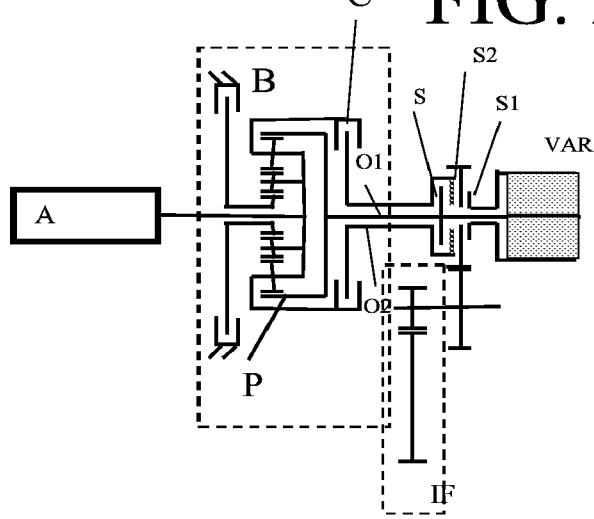
Figure 23:
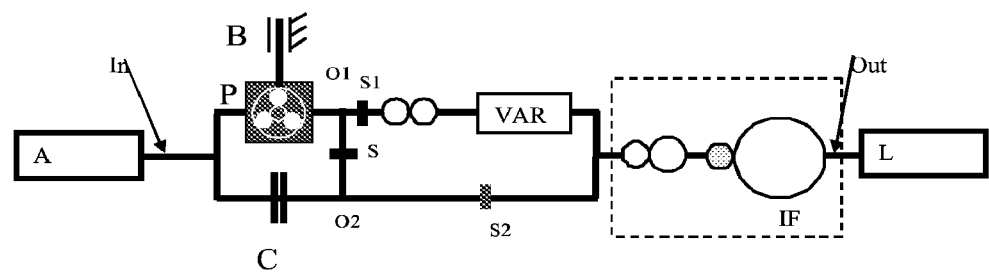
Figure 24:
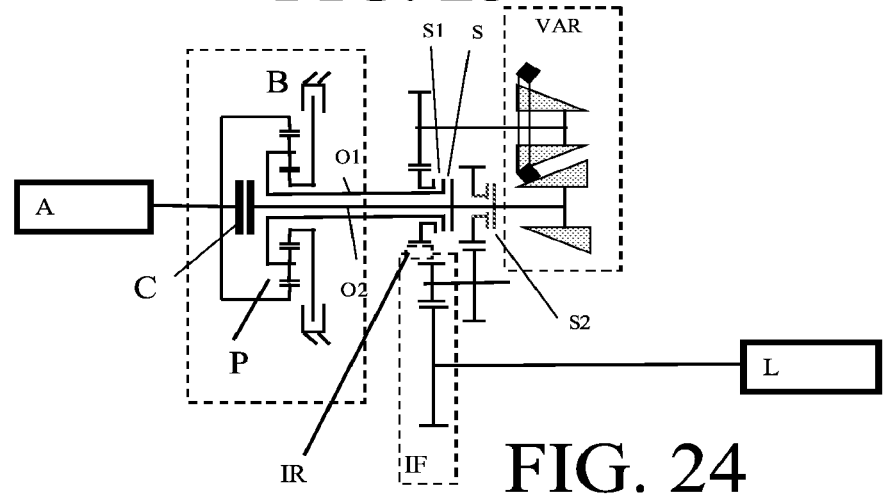
Figure 25:
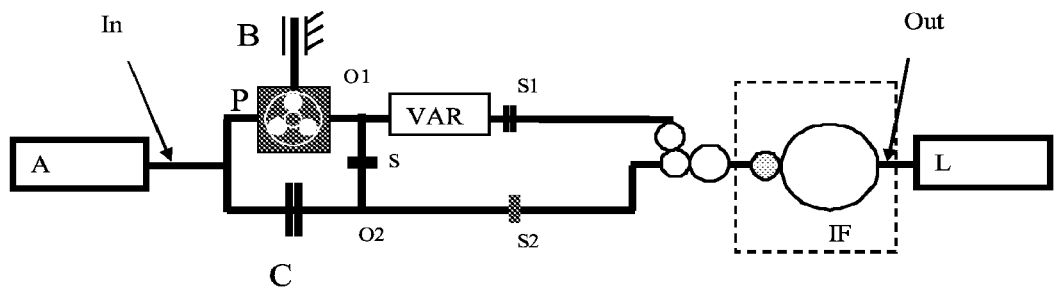
Figure 26:
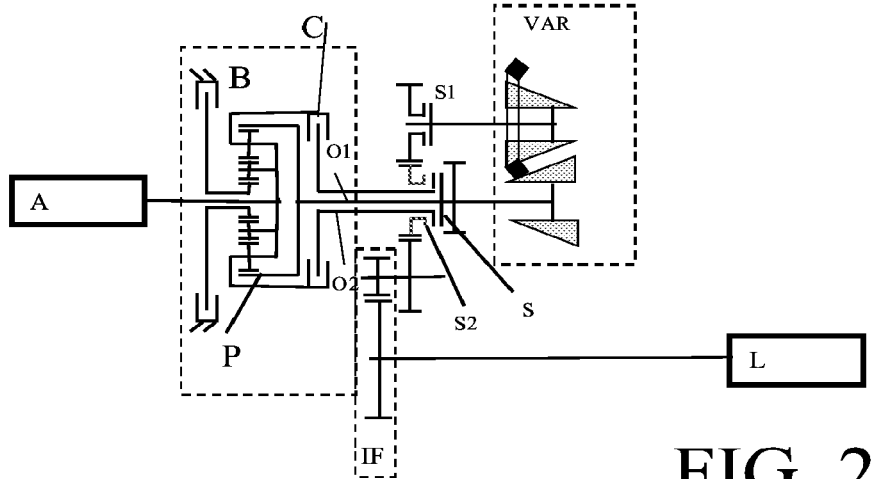
Figure 27:
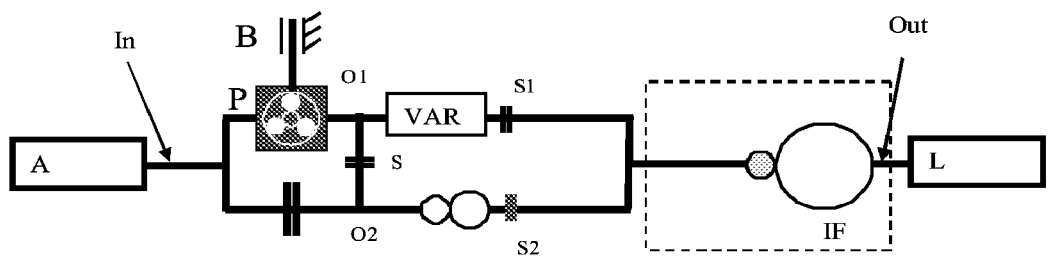
Figure 28:
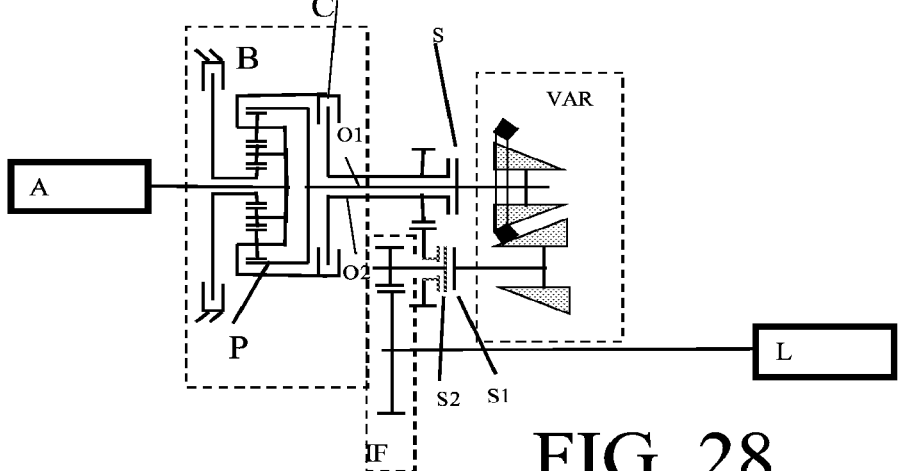
Figure 29:
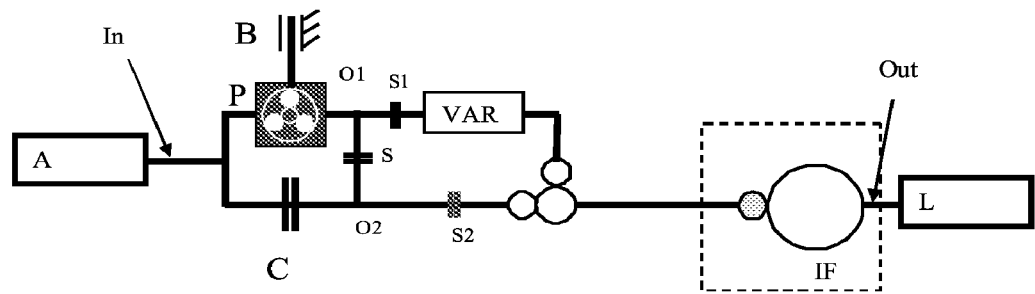
Figure 30:
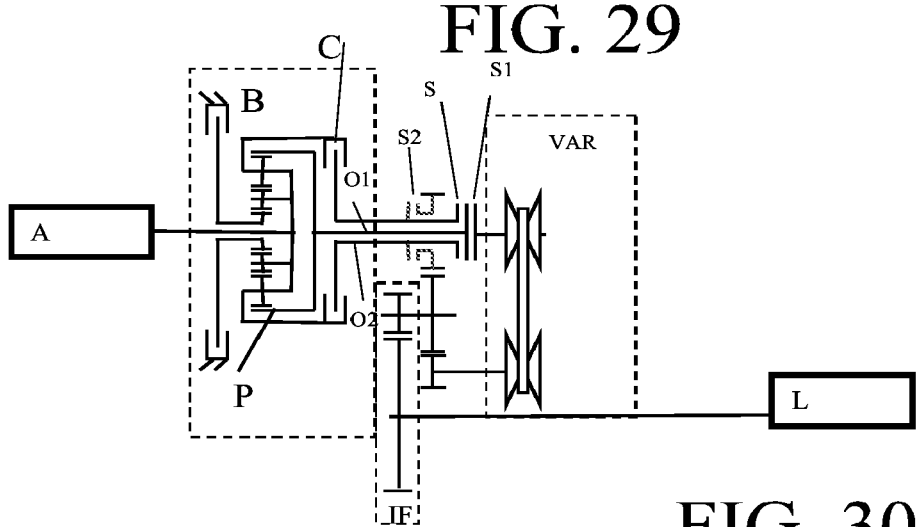
Figure 31:
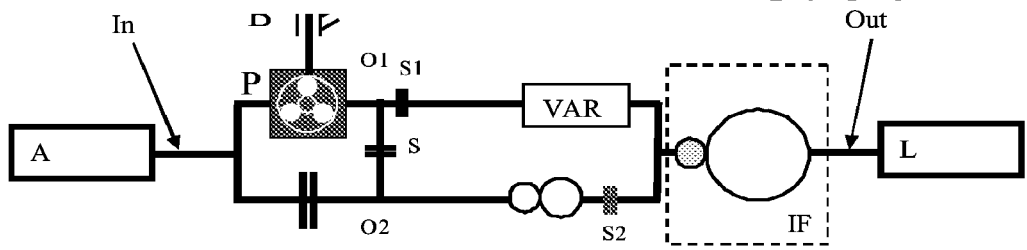

FIGS. 15 to 30 show further embodiments of the transmission system. The variable speed drives of the transmission systems shown in FIGS. 20 and 22 have an input and an output which are concentric/coaxial and the input and output have the same direction of rotation.

Figure 32:
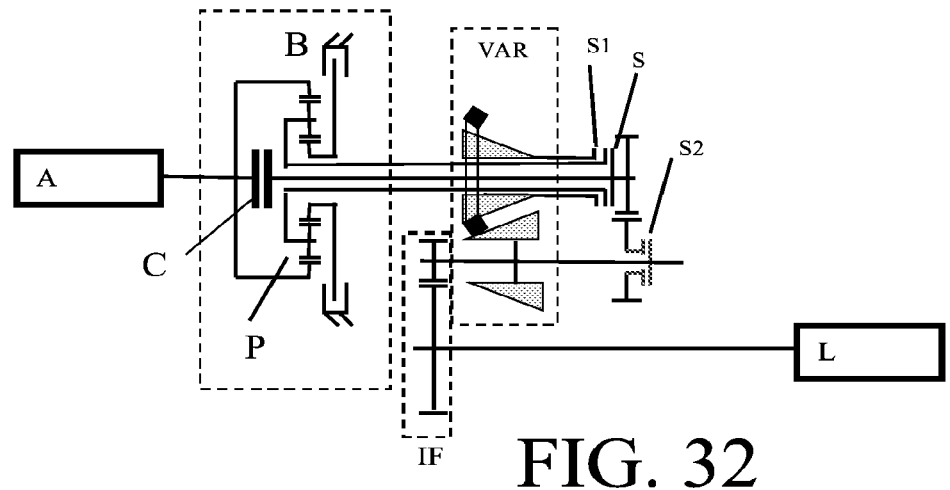
FIGS. 32 and 34 show still further embodiments of a transmission system according to the present invention, having a variable speed drive, for example a cone-ring variable speed drive.
Figure 33:
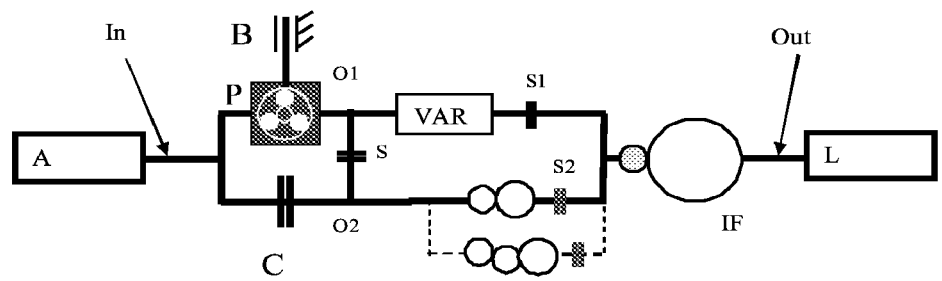
Figure 34:
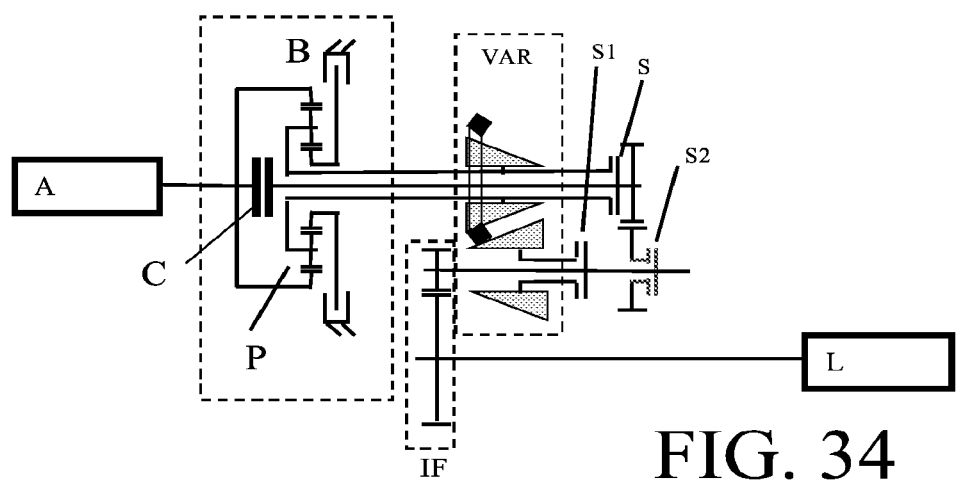
Figure 35:
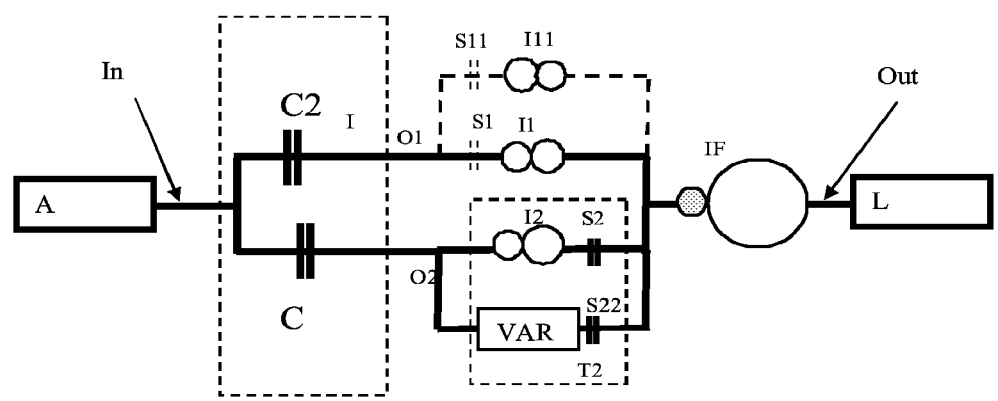
FIGS. 35-45 show still further embodiments of a transmission system according to the present invention, comprising a clutch.
Figure 36:
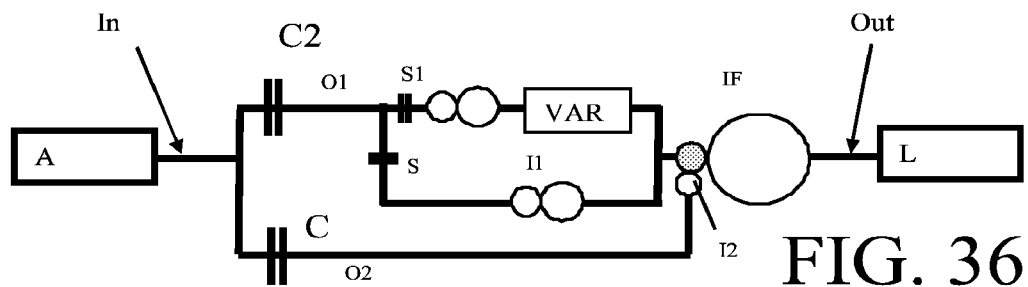
Figure 37:
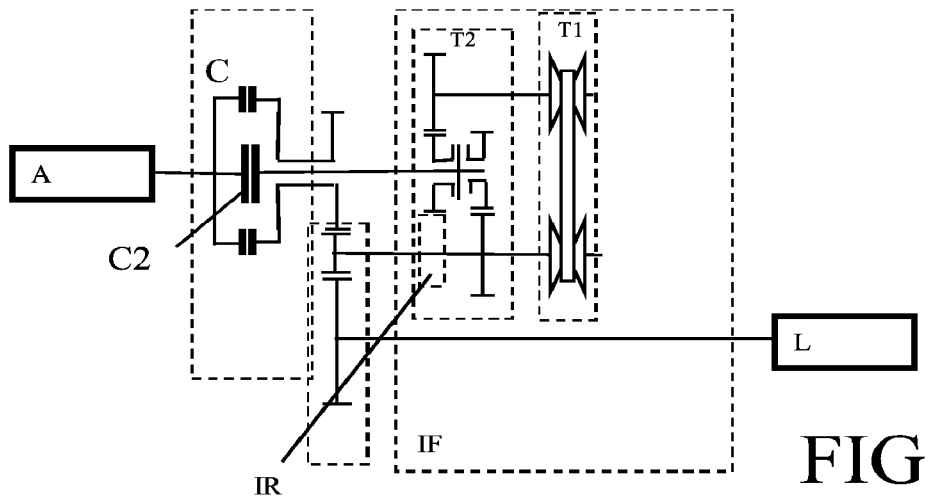
Figure 38:
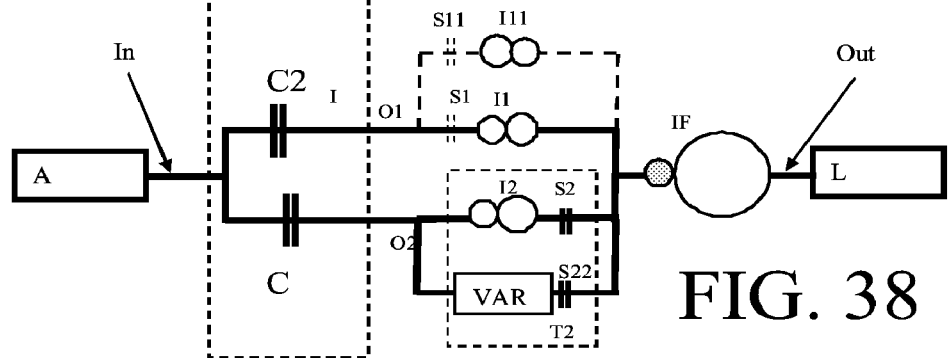
Figure 39:
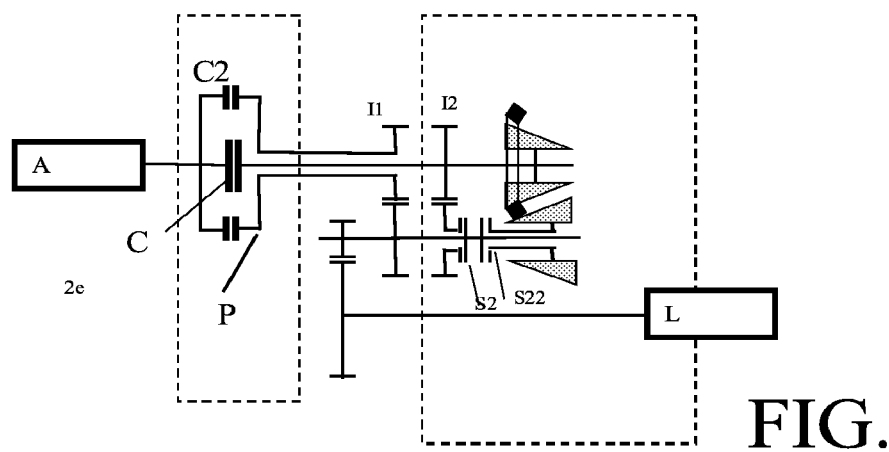
Figure 40:
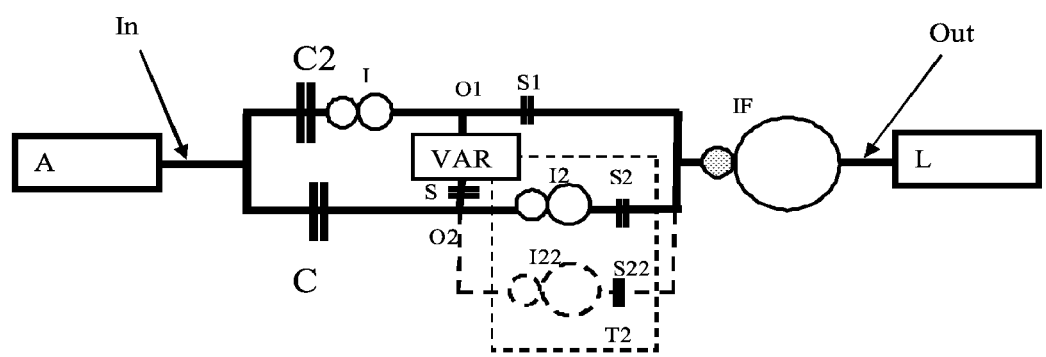
Figure 41:
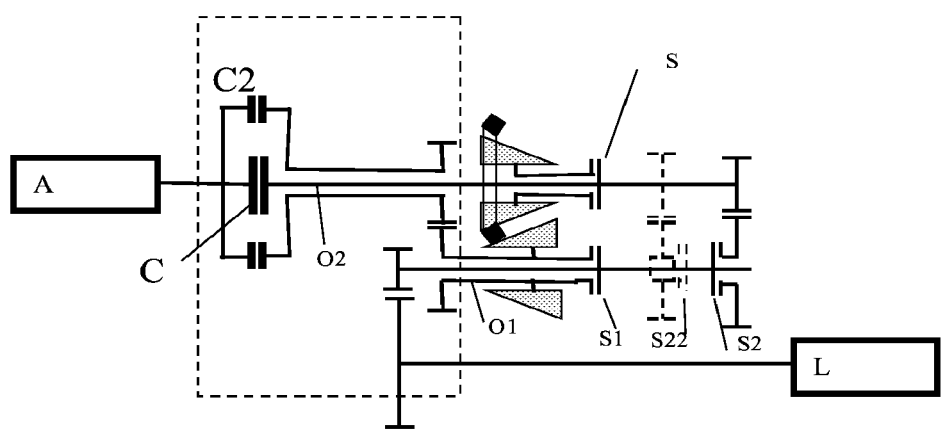
Figure 42:
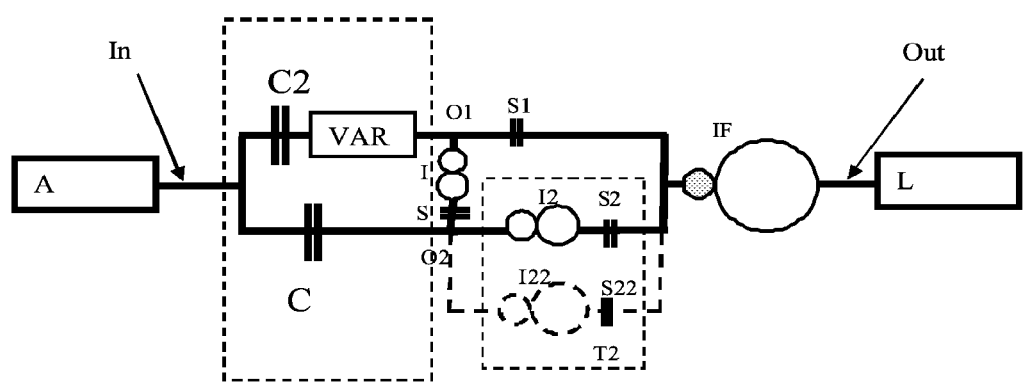
Figure 43:
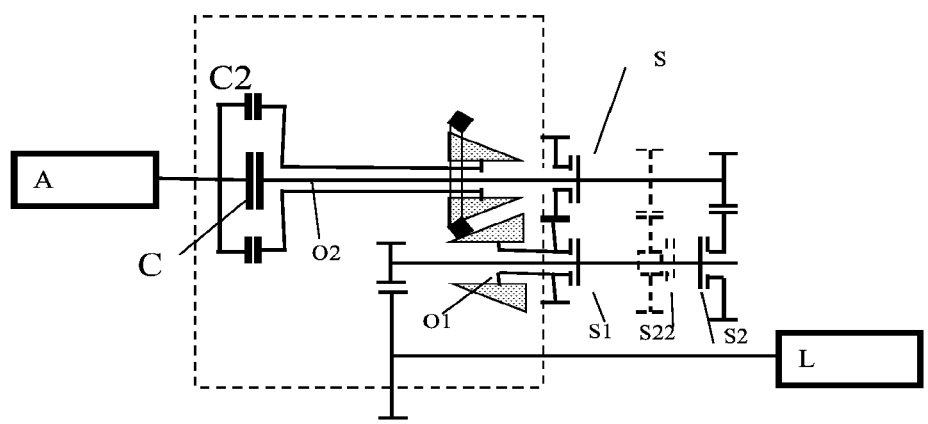
Figure 44:
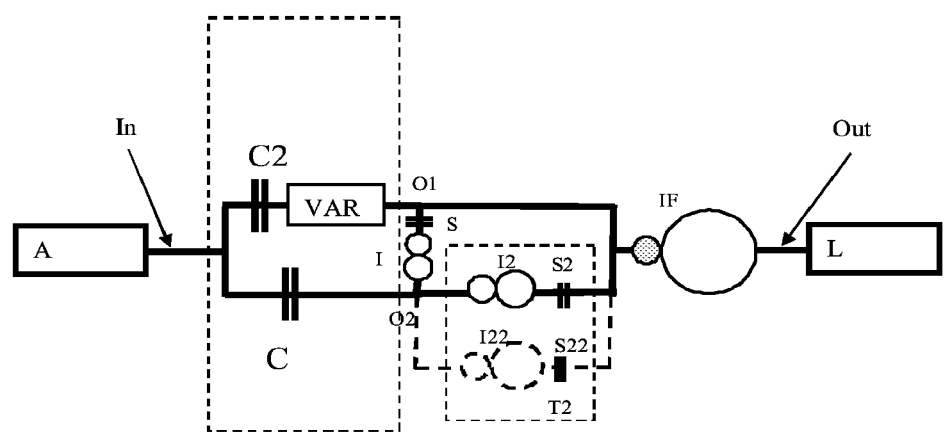
Figure 45:
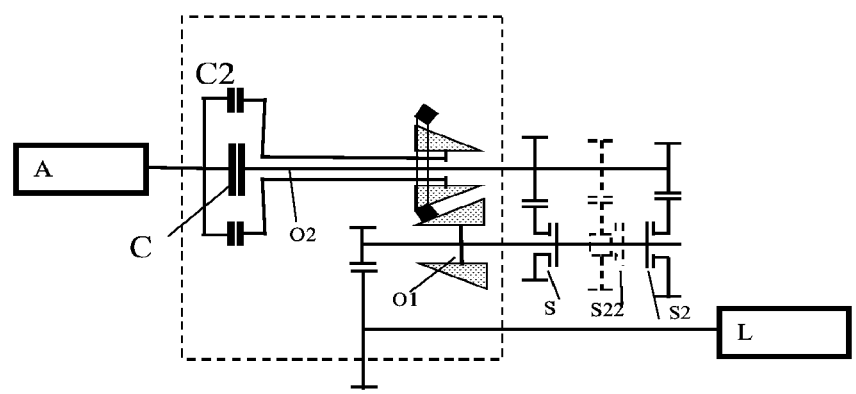

In the embodiments shown in FIGS. 32 and 34 the variable speed drive is such that it changed the direction of rotation is (for example a cone-ring variable speed drive). This saves one toothed gear reduction.

In the embodiments shown in FIGS. 35 to 45 the transmission system comprises a clutch C2.

Figure 46:
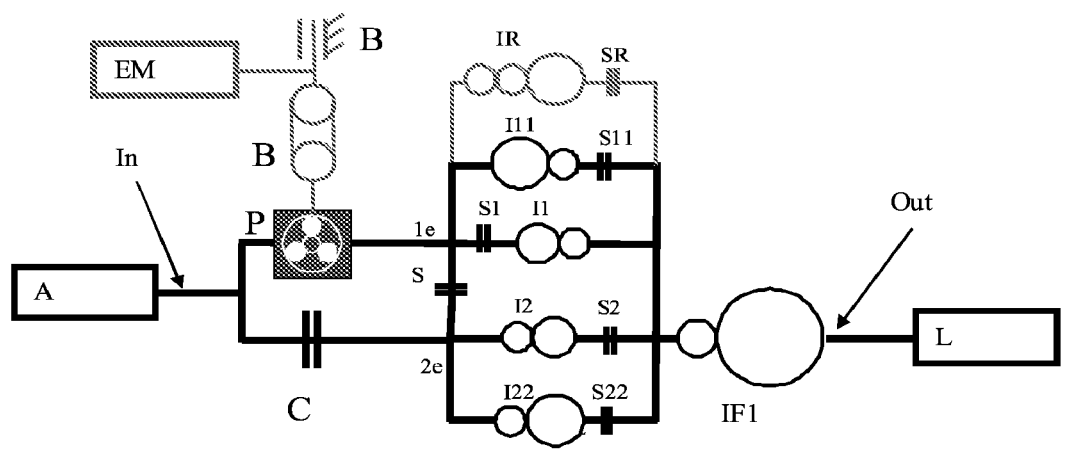
FIGS. 46 and 47 show still further embodiments of a transmission system according to the invention, which according to these figures is a 6/7 speed transmission having a brake and a clutch, as well as a single lay-shaft.
Figure 47:
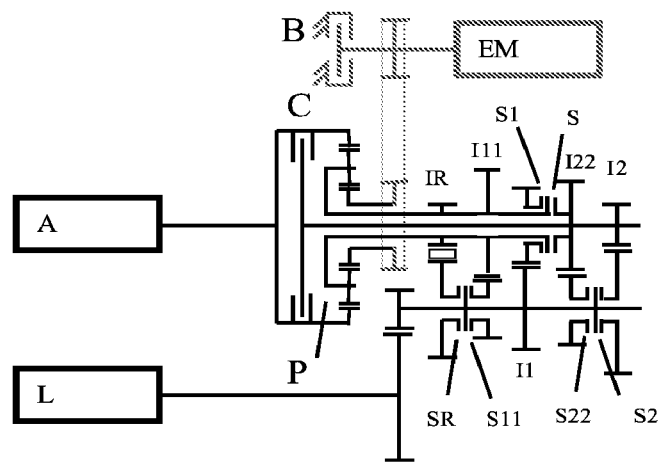

The transmission system shown in FIGS. 46 and 47 is a 6/7 speed transmission having a brake B and a clutch C and a single lay-shaft. In total there are 13 gearwheels and a planetary gear set which constitute 8 forward gearwheels, 3 reverse gearwheels, 2 final drive gearwheels and 6 synchronizers (incl. reverse). Electric motor EM is an electric motor-generator which is connected to the third rotational member (sun wheel) of the planetary set. Preferably the electric motor is connected to the sun wheel by means of a chain drive or gear wheel drive. The brake B is optionally because the electric motor EM—when large enough—is also able to support the torque of the combustion engine. With the electric motor EM and the planetary set a so called electric variable transmission is created with which steples scan be switched between ratio's in the transmission. Brake B can be added, for example in line with the shaft of the electric motor EM in case the electric motor is small. The brake B can be a claw to the fixed world of a force closed friction clutch. The electric motor EM is preferably parallel with the shafts of the transmission outside the housing of the transmission. With the electric motor also transmission clutches can be synchronized or synchronization can be supported.

Although the present invention is elucidated above on the basis of the given drawings, it should be noted that this invention is not limited whatsoever to the embodiments shown in the drawings. The invention also extends to all embodiments deviating from the embodiments shown in the drawings within the context defined by the claims.

The invention claimed is:

1. A transmission system comprising:
   a clutch module having an input, a first output connected to a first input to a transmission module, and a second output connected to a second input to the transmission module, the clutch module comprising a first clutch device between the input and the first output of the clutch module and further comprising a second clutch device between the input and the second output of the clutch module;
   the transmission module comprising:
   a first partial transmission having at least one transmission, the first partial transmission connected along the first input to the transmission module;
   a second partial transmission having at least one further transmission or a mechanical connection, the second partial transmission connected along the second input to the transmission module,
   wherein the second partial transmission is a final speed transforming gear.

2. The transmission system of claim 1, wherein the second clutch device is connected along the second input to the transmission module.

3. The transmission system of claim 1, wherein the final speed transforming gear is connected to an output of the transmission module, and further connected to both an output of the first partial transmission and the second input to the transmission module.

4. The transmission system of claim 1, wherein the at least one transmission of the first partial transmission is a variable speed drive.

5. The transmission system of claim 4, wherein the variable speed drive is mechanical, hydraulic, electrical, or a combination thereof.

6. The transmission system of claim 5, wherein the variable speed drive is mechanical and is selected from the group consisting of (i) a pulley variable speed drive with a push belt or chain, (ii) a cone-ring variable speed drive with two cones and a ring, and (iii) a planetary gear with at least three rotational members.

7. The transmission system of claim 1, wherein the first partial transmission comprises first and second intermediate speed transforming gears, connected in parallel along the first input to the transmission module.

8. The transmission system of claim 7, further comprising a short circuit clutch between the first and second intermediate speed transforming gears.

9. The transmission system of claim 7, further comprising a transmission clutch between the first output of the clutch module and the first intermediate speed transforming gear.

10. The transmission system of claim 7, further comprising both a short circuit clutch between the first and second intermediate speed transforming gears and a transmission clutch between the first output of the clutch module and the first intermediate speed transforming gear.

11. The transmission system of claim 7, wherein the at least one transmission of the first partial transmission is a variable speed drive, between the first intermediate speed transforming gear and the final speed transforming gear.

12. The transmission system of claim 11, wherein the first partial transmission comprises the first and second intermediate speed transforming gears, connected in parallel along the first input to the transmission module, and further comprises the variable speed drive, between the first intermediate speed transforming gear and the final speed transforming gear, the first partial transmission further comprising:
a short circuit clutch between the first and second intermediate speed transforming gears; and
a transmission clutch between the first output of the clutch module and the first intermediate speed transforming gear.

13. The transmission system of claim 12, wherein the short circuit clutch is further between the first output of the clutch module and the second intermediate speed transforming gear.

14. The transmission system of claim 12, wherein the second intermediate speed transforming gear is between the short circuit clutch and the final speed transforming gear.

15. The transmission system of claim 12, wherein the first intermediate speed transforming gear is between the transmission clutch and the variable speed drive.

16. A transmission system comprising:
a clutch module having an input, a first output connected to a first clutch device, and a second output connected to a second clutch device,
wherein the first clutch device is further connected to a partial transmission having a variable speed drive, the partial transmission further connected along a first input to a transmission module; and
wherein the second clutch device is further connected along a second input to the transmission module,
wherein the first partial transmission comprises:
a transmission clutch and a short circuit clutch, the transmission clutch connected along a first connection path from the first output of the clutch module and the short circuit clutch connected along a second connection path from the first output of the clutch module;
a first intermediate speed transforming gear, connected between the transmission clutch and the variable speed drive, along the first connection path;
a second intermediate speed transforming gear, connected between the short circuit clutch and the final speed transforming gear, along the second connection path,
wherein the first connection path from the variable speed drive and the second connection path from the second intermediate speed transforming gear, in combination, form the first input to the transmission module,
wherein both the first and second inputs to the transmission module are connected to a final speed transforming gear that is further connected to an output of the transmission module.

17. A transmission system comprising:
a clutch module having an input, a clutch device between the input and a first output of the clutch module, and a planetary gear set between the input and a second output of the clutch module,
wherein the first and second outputs of the clutch module are connected through a partial transmission to a final speed transforming gear that is further connected to an output of the transmission module,
wherein the partial transmission comprises a plurality of parallel connection paths, each connection path connecting a speed transforming gear and respective transmission clutch, and further wherein a short circuit clutch is between two of said connection paths.

18. The transmission system of claim 17, wherein the plurality of parallel connection paths are four parallel connection paths, and further wherein the short circuit clutch is between a second and a third, adjacent connection path.

19. The transmission system of claim 17, further comprising an electric motor connected to a rotational member of the planetary gear set.

20. The transmission system of claim 19, wherein the rotational member is a sun wheel of the planetary gear set.

21. The transmission system of claim 17, which is a 6/7 speed transmission further comprising a brake connected between the electric motor and the planetary gear set.

* * * * *